United States Patent
Zeilingold et al.

(10) Patent No.: US 9,537,999 B2
(45) Date of Patent: *Jan. 3, 2017

(54) AUTOMATIC SWITCHING OF MODES AND MODE CONTROL CAPABILITIES ON A WIRELESS COMMUNICATION DEVICE

(71) Applicant: QUALCOMM Incorporated, San Diego, CA (US)

(72) Inventors: Daphna Zeilingold, San Diego, CA (US); Stephen Alton Sprigg, Poway, CA (US); Ronen Stern, San Diego, CA (US); Vicki Christine Mealer-Burke, San Diego, CA (US); Michael-David Nakayoshi Canoy, San Diego, CA (US); Eric Darnell Larkin, Sr., La Jolla, CA (US); Kristin Parsley Atkins, San Diego, CA (US); Susan Lynn Silveira, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,170

(22) Filed: Feb. 8, 2016

(65) Prior Publication Data
US 2016/0156772 A1    Jun. 2, 2016

Related U.S. Application Data

(63) Continuation of application No. 14/485,605, filed on Sep. 12, 2014, now Pat. No. 9,313,320.
(Continued)

(51) Int. Cl.
*H04W 4/02* (2009.01)
*H04M 1/725* (2006.01)
(Continued)

(52) U.S. Cl.
CPC ........ *H04M 1/72563* (2013.01); *H04L 63/107* (2013.01); *H04M 1/72572* (2013.01);
(Continued)

(58) Field of Classification Search
USPC .............................. 455/456.1, 456.3, 456.6
See application file for complete search history.

(56) References Cited

U.S. PATENT DOCUMENTS

| 7,221,939 | B2 | 5/2007 | Ylitalo et al. |
| 7,426,197 | B2 | 9/2008 | Schotten et al. |

(Continued)

FOREIGN PATENT DOCUMENTS

EP    2693360 A2    2/2014

OTHER PUBLICATIONS

International Search Report and Written Opinion—PCT/US2015/016404—ISA/EPO—Apr. 22, 2015.
(Continued)

*Primary Examiner* — Kevin Kim
(74) *Attorney, Agent, or Firm* — The Marbury Law Group, PLLC

(57) ABSTRACT

Methods, systems and devices for implementing different modes or persona of a wireless communication device that allow the wireless communication device to function as multiple devices corresponding to conditions and circumstances that may be defined by an enterprise. Operating modes or persona may be defined by a set of operating characteristics that may include user permissions, device functionality, capabilities enabled, and user restrictions that may be selected by the enterprise. Automatic switching between modes/persona may be controlled through triggers based on any of location, proximity, time, and context of the wireless communication device. Automatic switching of mode control capabilities may also controlled through such
(Continued)

triggers, enabling an enterprise to limit the ability of users to override the automatic mode/persona implemented in response to an enterprise-defined trigger.

28 Claims, 6 Drawing Sheets

Related U.S. Application Data

(60) Provisional application No. 61/941,674, filed on Feb. 19, 2014.

(51) Int. Cl.
*H04L 29/06* (2006.01)
*H04W 4/00* (2009.01)
*H04W 12/08* (2009.01)

(52) U.S. Cl.
CPC ........... *H04W 4/001* (2013.01); *H04W 4/021* (2013.01); *H04W 12/08* (2013.01)

(56) References Cited

U.S. PATENT DOCUMENTS

| | | |
|---|---|---|
| 7,469,155 B2 | 12/2008 | Chu |
| 8,750,895 B2 | 6/2014 | Grosman et al. |
| 2011/0117902 A1 | 5/2011 | Chang et al. |
| 2012/0309376 A1 | 12/2012 | Huang et al. |
| 2012/0309409 A1 | 12/2012 | Grosman et al. |
| 2013/0093627 A1 | 4/2013 | Cosman |
| 2015/0176998 A1 | 6/2015 | Huang et al. |
| 2015/0237193 A1 | 8/2015 | Zeilingold et al. |

OTHER PUBLICATIONS

Yahya S.Z., "Auto-Silent Mode for Windows Phone," Jan. 5, 2014, 4 pages.

AUTOMATIC SWITCHING OF MODES AND MODE CONTROL CAPABILITIES ON A WIRELESS COMMUNICATION DEVICE

RELATED APPLICATIONS

This application is a continuation of U.S. patent application Ser. No. 14/485,605, entitled "Automatic Switching of Modes and Mode Control Capabilities On a Wireless Communication Device" filed Sep. 12, 2014, which claims priority to U.S. Provisional Application No. 61/941,674 filed Feb. 19, 2014, the contents of which are hereby incorporated by reference in their entireties.

BACKGROUND

Cellular and wireless communication technologies have seen explosive growth over the past several years. This growth has been fueled by better communications hardware, larger networks and more reliable protocols. Wireless service providers are now able to offer their customers an ever-expanding array of features and services, and provide users with unprecedented levels of access to information, resources and communications. Today's wireless communication devices may include, for example, cameras, GPS receivers, MP3 players, and provide access to web content, data sharing, application downloading, and many other features. Further, mobile applications that provide on-the-go connectivity to enterprise systems and/or intranets have increased in availability such that a single wireless device may be able to access a number of mobile environments that each may require different levels of security, in addition to personal applications and content implemented by the user in a generally unrestricted environment. While different "personas" or operating modes may be implemented on wireless devices to segregate access to data and programs in these environments, the operation of switching to a different persona is typically triggered manually by a user. As such, the benefits provided by a particular mode may be circumvented by a user's ability to simply switch out of that mode or the user forgetting to switch to the appropriate mode for a particular situation or location. Further, while some device settings may be configured to change automatically in response to particular conditions, such settings typically pertain only to features of the user interface (e.g., volume, display, etc.)

SUMMARY

The various embodiments provide systems, devices, and methods for automatically controlling multiple modes on a wireless communication device. Various embodiments enable receiving a signal from a wireless identity transmitter, receiving a notification of a geofence event, determining a first operating mode by applying the location of the wireless communication device to the indicated wireless identity transmitter, identifying a set of operating characteristics (as that term is defined herein) associated with the first operating mode, and switching operation of the wireless communication device into the first operating mode by implementing the associated set of operating characteristics on the wireless communication device. In some embodiment methods and devices, the received signal indicates that the wireless identity transmitter is within a proximity area of the wireless communication device, and the geofence event identifies a location of the wireless communication device.

Various embodiments also enable determining whether the first operating mode is associated with at least one mode control capability, in which each mode control capability may include a setting that defines a level of user control for selecting a mode other than the first operating mode, and determining whether to switch to a new mode control capability in response to determining that the first operating mode is associated with at least one mode control capability.

In some embodiment methods and devices, the operating characteristics associated with the first operating mode may include at least one of user permissions, user restrictions, a mandated content storage location on the wireless communication device, and a mandated subscription for communication on the wireless communication device, and the set of operating characteristics associated with the first operating mode and a mode control capability setting associated with the first mode control capability may be created by an enterprise. In some embodiment methods and devices, identifying the set of operating characteristics associated with the first operating mode may include determining whether the operating characteristics associated with the first operating mode are stored in memory on the wireless communication device, and sending a request to a server to obtain the set of operating characteristics associated with the first operating mode in response to determining that the operating characteristics associated with the first operating mode are not stored in memory.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
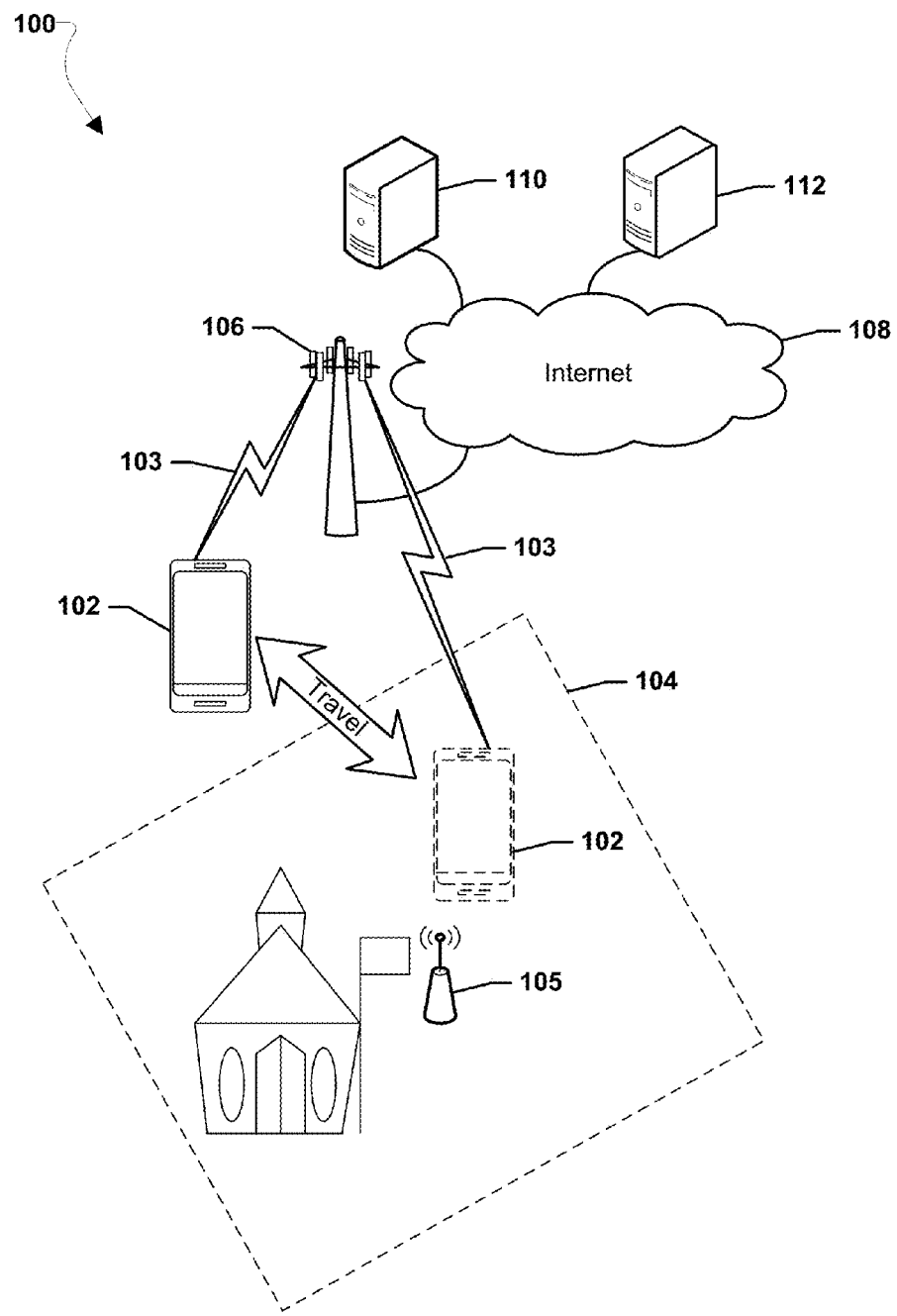
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "wireless device" and "wireless communication device" are used interchangeably herein to refer to any one or all of cellular telephones, smartphones (e.g., iPhone), web-pads, tablet computing devices ("tablets"), Internet enabled cellular telephones, WiFi enabled electronic devices, personal data assistants (PDA's), laptop computers, personal computers, computers sending and receiving short message service (SMS) messages, multimedia message service (MMS) messages, and/or electronic mail (email) and similar electronic devices including a wireless transceiver and a programmable processor. However, the terms "wireless communication device," and "wireless device" should not be limited to the enumerated list of devices.

The term "operating mode" is used herein to refer to a combination of settings, content, middleware, firmware, drivers, applications, and/or file systems that provides a particular computing environment on a wireless device.

For ease of reference, the term "enterprise" is used herein to refer generally to organizations, businesses, public and private facilities, military and government entities, affiliations, clubs, or other organizations that may have a need to define how wireless communication devices should behave. Some non-limiting examples of enterprises include businesses, schools, hospitals, military installations, government facilities, airports, national parks, museums, movie theaters, shopping malls, large sporting events, etc.

The various embodiments provide methods, devices and systems for automatically switching between different operating modes and mode control capabilities, which are generally referred to herein, in combination or individually, as "personas." In this manner, multiple enterprises may set various limitations and customizations such that a single user device may behave as several different devices. A specific trigger may activate a particular set of capabilities, functionalities, permissions and behaviors comprising an operating mode associated with an enterprise, as well as a particular mode control capability that defines the extent to which a user may manually select a different mode. In various embodiments, the specific trigger may be a combination of a proximity to a particular device, as well as a location (e.g., with respect to a geofence). In various embodiments, the specific trigger may further include date, time of day, application or context-based conditions, receipt of prompts from remote sources, and any combination thereof.

Modern wireless devices, including smartphones, tablet computers, gaming devices, etc., offer their users an unprecedented degree of connectivity, access, convenience and safety. As wireless devices like smartphones and tablet computing devices continue to grow in popularity, they are quickly becoming an indispensible tool for navigating modern society, interacting with one another, and quickly and efficiently accomplishing many everyday tasks. As a result, many institutions are integrating mobile technology into their systems to provide additional features, improve current solutions, and/or increase convenience to users. For example, a school or classroom may supplement classroom instruction by providing students with mobile access to course content, as well as other features such as portals, document exchange servers, and/or integrated learning applications. In another example, a hospital may provide various mobile tools and platforms to increase communication efficiency, improve accuracy, and/or provide specified information to different user groups (e.g., doctors, patients, insurance providers, etc.). In some institutions, application interfaces provided on physicians' wireless devices may allow monitoring of patient data (e.g., sensor readouts, lab results, etc.). In another example, businesses may provide employee wireless communication devices with mobile access to content, data and applications to facilitate performance of work-related tasks (e.g., wireless access to corporate email account, calendars, databases, etc), a time-based constraint, a date-based constraint, or a signal received from a remote device. For example, wireless communication devices may be provided mobile access based on a date-based constraint appointment scheduled through a calendar application. In a further example, some public facilities such as airports, national parks, museums, movie theaters, shopping malls, and sports stadiums may provide information and/or advertisements to patrons, while restricting some wireless accesses or controlling some device configurations (e.g., forcing devices to hush mode).

Enterprises may benefit from imposing various restrictions on wireless devices that are accessing their respective resources, while enabling other functionalities. Such restrictions may be driven by concerns over access security/authorization, information privacy, system load, legal compliances, and user experience, to name just a few examples.

Existing solutions for imposing restrictions on wireless communication devices include configuring devices to operate in different modes corresponding to different enterprises, with the data and applications for each being segregated on the device. However, enterprises may also benefit from improved management and control over how and when different modes are implemented by users.

The various embodiments provide systems and methods for implementing a comprehensive set of operating modes, mode control capabilities, and automatic persona switching functions for different enterprises on a single wireless device. A secure engine in a user's wireless communication device may be configured to detect various triggers and to perform automatic switching of modes/personas, including automatic switching of mode control capabilities to limit the ability of users to override or change mode/persona. Various triggers that may be used to implement such automatic switching include a wireless device's detection of or interaction with a geofence and/or a proximity beacon. Other triggers may include time-restricted settings, applications-based conditions, signals sent in real-time by remote parties, and more. Further, various combinations of triggers may be used to cause automatic mode switching in highly specific contexts, which enterprises may use to trigger particularly customized modes or personas on wireless communication devices.

A variety of wireless communication devices maybe used to implement the various embodiments. Example wireless communication devices may include tablet computers (e.g., the Apple iPad® and similar products made by other manufactures) and smartphones. Being portable and configured with significant computing capabilities, near-continuous cellular and WiFi network access, numerous applications and intuitive user interfaces, such wireless communication devices are ideal for providing access to educational, business and entertainment resources. In terms of functionality and operation, the differences between these wireless devices and other types of wireless devices are expected to become less significant over time. Therefore, in order to simplify the descriptions of the various embodiments, the drawings and the following embodiment descriptions may refer to user devices, wireless communication devices, and/ or wireless devices as representative of all types of applicable devices, which references are not intended to limit the scope of the claims.

The various embodiments may be implemented within a variety of communication systems, an example of which is illustrated in FIG. 1. Wireless communication system 100 may include multiple devices, such as a wireless communication device 102 configured to communicate via data signals 103 (e.g., wide area network (WAN) signals) through one or more cellular towers or base stations 106, and one or more servers 110, 112 connected to the Internet 108. The wireless communication device 102 may exchange data via one or more data signals 103, which may be a CDMA, TDMA, GSM, PCS, 3G, 4G, LTE, etc. or any other type cellular connection, with the cellular tower or base station 106. The cellular tower or base station 106 may be in communication with a router, which may connect to the Internet 108. In this manner, via the connections to the cellular tower or base station 106, and/or Internet 108, data may be exchanged between the wireless communication device 102 and the server(s) 110, 112. In an embodiment, a server 110 may be a content server, such as a web server hosting pages and other content associated with a website. In an embodiment, another server 112 may be an enterprise's control settings server operated by the enterprise to manage various personas of wireless communication devices 102 via the cellular network that includes a cellular tower or base station 106. While features of wireless communication devices, modems, and servers described herein may be described with reference to WAN cellular connections and modems, these features may be used with other type connections, both wired and wireless, and other type wireless communication devices, modems, and servers. WAN cellular connections, modems, and servers are used herein merely to illustrate features of the various embodiments and are not intended to limit the various embodiments in any way. Other types of wireless communication devices, modems, and servers may be used with the various embodiments, and the other wireless communication devices, modems, and servers may be substituted in the various examples without departing from the spirit or scope of the invention.

In an embodiment, an enterprise desiring to control an operating mode/mode control capability of wireless communication devices may only control the mode/capability part of the time, or only in specific situations. For example, a school district may only want to impose a school persona, which may include an operating mode and/or mode control capability, when the wireless communication device 102 is located within a geofence 104 defining the grounds of a school in the school district. For example, the wireless communication device 102 may be configured to operate according to a school persona while within a school geofence 104, and operate according to a user-defined (i.e., unconstrained) persona at all other times. Therefore, upon traveling into a school geofence 104, the wireless communication device 102 may change its permissions, functionality, user interface, accessible applications, etc. consistent with the school persona. In this manner, a school district may place restrictions and enable functionalities on wireless communication devices 102 used by students when they are at school.

In various embodiments, a wireless communication device 102 may determine its location, and particularly its position within a geofence 104 using any of a number of technologies. In some embodiments, the wireless communication device 102 may determine its location using a global positioning system (GPS) receiver and compare its location to coordinate boundaries of the geofence 104. In some embodiments, the wireless communication device 102 may compare the cell tower identifier (ID) of the cell tower 106 with which they are connect to cell tower IDs correlated to geofences 104. For example, a school geofence 104 may be defined by the cell tower ID of the closest cell tower 106.

Additionally or alternatively, the wireless communication device 102 may determine its position relative to another location by receiving signals from a wireless proximity beacon 105. In some embodiments, the wireless proximity beacon 105 may broadcast signals with a reception range that defines the geofence 104. For example, a wireless proximity beacon 105 may broadcast Bluetooth signals that may be received by wireless communication devices 102 configured with an application that enables them to obtain an ID of the wireless proximity beacon 105 from the signals and recognize when reception of signals with that ID indicates the wireless communication device is within the geofence 104. In some embodiments, the process of recognizing the wireless proximity beacon ID and/or correlating the ID with a particular geofence 104 may involve a wireless communication device 102 transmitting a sighting message including the ID to a server 110, 112 via the signals 103 of the cellular data network and the Internet 108, the server recognizing the ID, and the server informing the wireless communication device via a response message of a geofence, a proximity beacon, or the need to implement an associated operating mode and/or mode control capability.

The wireless communication system 100 may include one or more control settings servers, such as an enterprise's control settings server 112 accessible via the Internet 108. The connection between the enterprise control settings server 112 and the wireless network may be through the Internet 108 or through a private network. Alternatively, the enterprise settings server 112 may be implemented as a server within the network infrastructure of the wireless network. Control settings servers 112 may include various interfaces providing access to computing systems of the enterprises such as via the Internet 108. Enterprises may have their own control settings servers 112 that they use to create, update and/or maintain settings for automatic mode switching and mode control capability switching. Alternatively, one or more control settings servers 112 may be central servers configured to manage persona switching for multiple enterprises. In other embodiments, each enterprise 9 may be associated with its own control settings server 112. The control settings servers 112 may be configured to store some or all of the sets of permissions, settings and controls that make up the various operating modes or persona, as well as settings that define different mode control capabilities. In addition, control settings servers 112 may be configured to store some or all of the triggering conditions set by each enterprise, which may be periodically sent to wireless communication devices 102 (e.g., via over-the-air updates) so that persona switching engines may update their respective local settings for automatic switching.

Each operating mode of wireless communication devices 102 may be defined by a set of operating characteristics, including, but not limited to, various permissions, settings, controls, content, and other configurations that specify the device features that should be enabled, disabled, restricted, and/or otherwise controlled by an enterprise. Additionally, each operating mode may also be defined by how the wireless communication device segregates its applications and the associated data. For example, a mobile application in a personal operating mode may be unable to access data of any application in enterprise mode. Further, each operating mode or persona may control the ability to use peripheral components of the device, such as the camera, speaker, Bluetooth transceiver, display, WiFi transceiver, cellular transceiver, etc. For ease of reference all of the functionalities, permissions, settings, restrictions, data segmentations, and peripheral component configurations that may be controlled by (and thus define) an operating mode are referred to herein collectively and generally as "operating characteristics."

Some examples of the wireless device functions and features that may be restricted as a result of implementing a particular operating mode include use of hardware components (e.g., camera, GPS receiver, WiFi transceiver, etc.), normal telephone (i.e., voice calls), simple messing service (SMS) messaging, and multimedia messaging service (MMS) messaging. Some examples of wireless device functions and features that may be enabled as a result of implementing a particular operating mode include access to restricted data storage, enterprise-associated portals, online collaboration tools (e.g., Join.Me®, Skype®, etc.), access to an enterprise-specific contacts list, and more. Another example of enterprise control of operating characteristics in various operating modes may include use of a particular cellular data plan. In some embodiments, an operating mode may include settings that specify a particular service plan from among multiple service plans that may be available to the user. For example, activation of a "workplace" persona may include activation of an operating mode in which a user's wireless communication device switches to a communications service plan provided by the user's employer. In some embodiments, the user device may have previously associated a specific communications service plan with the employer. In alternative embodiments, the operating mode of the "workplace" persona may provide service plan parameters to be checked against available plans, the best matching of which may be selected for use on the wireless device.

In some embodiments, the operating characteristics and mode switching capabilities that define some or all of the various personas may be maintained locally in a secure memory location of the wireless device, which may be accessed by the persona-switching engine in response to an appropriate trigger. For example, operating characteristics and/or mode switching capabilities may be initially received from the control settings server 112, stored in memory on the wireless device, and periodically updated via communications pushed to the control settings server 112. Additionally or alternatively, operating characteristics and/or mode switching capabilities that define some or all of the various personas may be stored in the control settings server, and requested by the persona-switching engine in response to each appropriate trigger. In some embodiments, operating characteristics and/or mode switching capabilities associated with certain personas may be stored in local memory of a wireless communications device while others may be stored in a control settings server 112. In an embodiment, operating characteristics and mode switching capabilities of generalized personas (i.e., those that may be applied by multiple enterprises) may be stored locally, while operating characteristics and mode switching capabilities of customized personas (i.e., those created by an enterprise to accommodate specific scenarios or users) may be stored in a control settings server 112.

In an embodiment, a generalized "education" persona may designate an operating mode and mode switching capability that can be applied by any of a number of different enterprises. For example, switching to the "education" persona may cause Internet access and cellular service to be restricted on a user device, as well as gaming and audio/visual recording to be disabled. Further, switching to the "education" persona may enable certain functions and/or applications on the device, such as those that may assist in classroom learning, and may prevent the user from manually switching out of the "education" persona. In another embodiment, a customized "Math 101" persona may designate an operating mode and mode switching capability that are designed to be applied in a specific Math 101 course offered by the enterprise. For example, switching to the "Math 101" persona may cause Internet access on user device to be restricted to only a specific portal or web-page, and may cause communication service to be restricted such that only certain non-disruptive forms may be used to communicate with only a limited set of recipients (e.g., sending a question via email to a teacher or assistant during class). Further, switching to the "Math 101" persona may activate content and/or tools that are specific to the Math 101 course offered by the enterprise. In some embodiments, customized personas may be implemented as sub-modes of general personas.

In the various embodiments, the persona switching engine may be implemented as a secure software layer below the operating system. Running on a processor of the wireless communication device, the persona switching engine may cause the operating system to switch to a different operating mode and/or mode control capability based on interactions with any of a variety of triggers. Many techniques and systems may be used to implement such triggers, examples of which include, but are not limited to, proximity beacons and geofences.

In an embodiment system, a user's proximity to an enterprise-determined location may be recognized by reception of signals from a proximity beacon associated with that location. In general, a proximity beacon (also called a "wireless identity transmitter"), may be configured to broadcast messages that include a unique and secure identification code via a short-range wireless radio, such as a Bluetooth® Low Energy (LE) transceiver. The identification broadcast packets ("broadcast messages") may be received by physically proximate proximity broadcast receivers associated with users. For example, such functionality may be implemented in a wireless communication device configured with a specific event detecting application (i.e., a "proximity broadcast receiver application"). Broadcast messages from proximity beacons may be received by proximity broadcast receivers within a reception range, for example, within 0-25 feet.

In other embodiment systems, a user's location may be recognized by reception of signals associated with a geofence. As used herein, the term "geofence" may refer to a set of geographic coordinates defining a location, area, or boundary, which, when satisfied, initiates some associated functionality (e.g., recording the presence of the user at that place, pushing information, sending an alert, triggering an action or application, etc.) In various embodiments, a geofence may be made up of complex polygons or lines between coordinates, and therefore the term "geofence" may refer to one or more sets of points or coordinates defining a perimeter, a center point plus a radius, a vector space, and/or any other data structure for defining a 2D or 3D area or perimeter. In some embodiments, a geofence may be specified by points defined by latitude, longitude, and altitude values, while in other embodiments the points may be defined by a street address, intersections of roadways, etc.

Geofence boundaries and services may be provided, maintained or defined by a geofence server, an example of which is the Gimbal® server supported by QUALCOMM Incorporated. In various embodiments, the wireless communication device may be configured to execute a specific event detecting application (i.e., a "geofence-enabled application") that communicates with the geofence server, such as to receive the geographic characteristics/locations of nearby enterprise-associated geofences. While running on a wireless communication device, the geofence-enabled application may continually determine its location—for example, through the device's GPS receiver, Wi-Fi (e.g., pre-mapped Wi-Fi access point locations) and/or cellular connections (e.g., pre-mapped cellular tower locations). In the various embodiments, geofence-enabled application may compare the wireless communication device's location with the locations of known geofences to determine whether a geofence event has occurred (e.g., crossing into a geofenced area, exiting a geofenced area, etc.).

Geofence event information may be passed to the persona switching engine of the wireless communication device. In some embodiments, geofence event information may also be transmitted to the geofence server along with a request for updated geofence information (i.e., location of geofences near the updated location of the wireless communication device). In other embodiments, a geofence server may be configured to automatically update information for geofence-enabled applications operating on various wireless communication devices.

Figure 2:
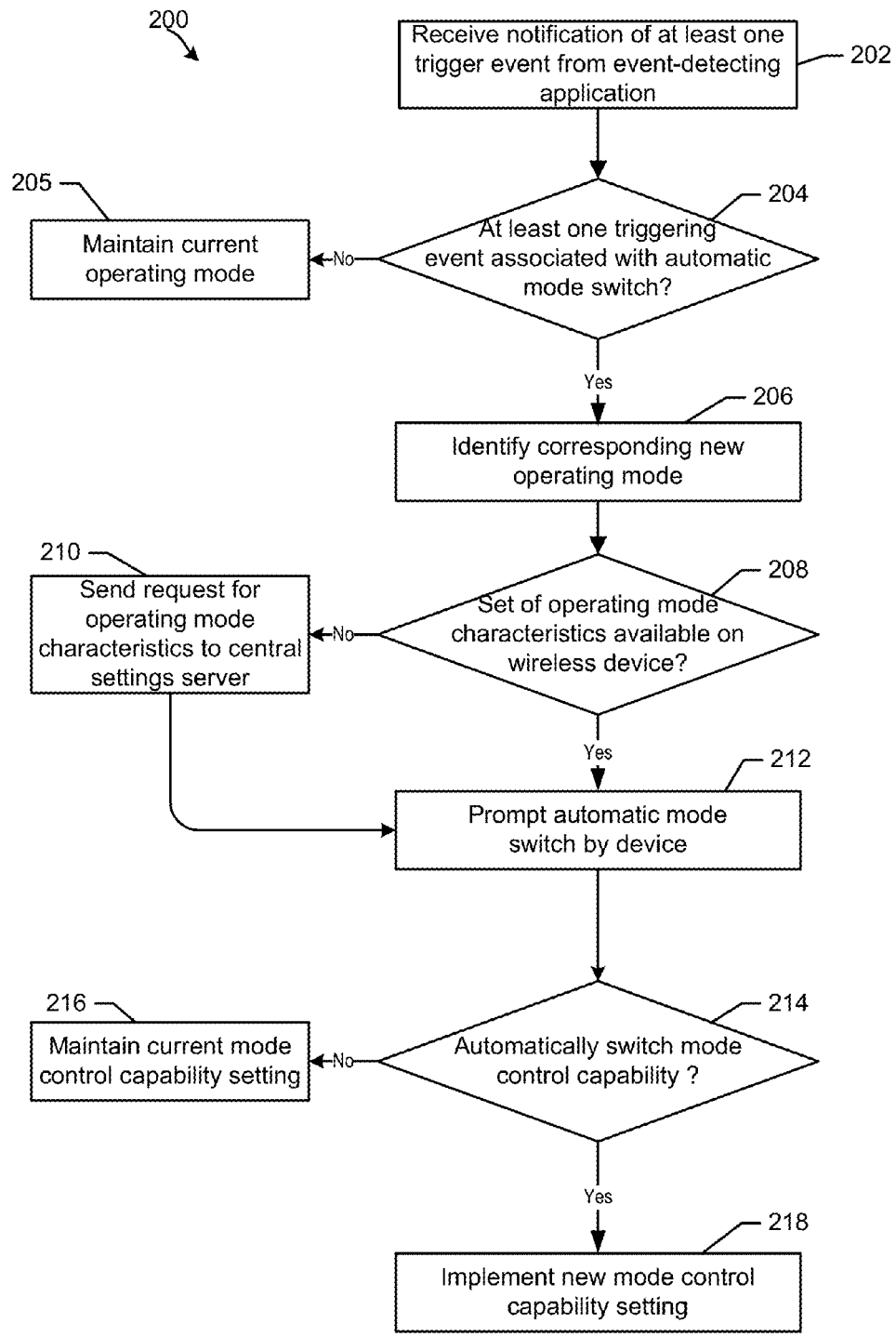
FIG. 2 is a process flow diagram illustrating an embodiment method for managing automatic mode switching triggered by a geofence event.

FIG. 2 illustrates an embodiment method 200 that may be implemented by a wireless communication device processor running a secure persona switching engine. In block 202, a notification of at least one trigger event may be received from at least one corresponding event-detecting application. In some embodiments, the at least one trigger event may be either or both of a geofence event and a proximity broadcast message, and the at least one corresponding event-detecting application may be one or both of a geofence-enabled application and a proximity broadcast receiver application. In an embodiment, the at least one notification may contain information about the at least trigger event, including the type of event, and a geographic location, identification of the proximity beacon, and/or enterprise identifier associated with the corresponding geofence or proximity beacon. For example, a first event notification may provide that a geofence has been crossed and that the wireless communication device has entered a geofence area at a particular address and/or at a particular identified school. A second event notification may additionally or alternatively provide that the wireless communication device is within a certain proximity of a beacon in a particular room or other space.

In determination block 204, the wireless communication device processor may determine whether the trigger event, or combination of trigger events, indicated by the at least one received notification is associated with an automatic mode switch (i.e., a switch to a new operating mode). In response to determining that the trigger event/combination of events is not associated with an automatic mode switch (i.e., determination block 204="No"), the wireless communication device processor may maintain a current operating mode and ignore the trigger event in block 205. In response to determining that the trigger event/combination of events is associated with an automatic mode switch (i.e., determination block 204="Yes"), the wireless communication device processor may identify a corresponding new operating mode in block 206. In some embodiments, identifying the corresponding new operating mode may be performed by accessing a local database or other data structure maintained in secure storage on the wireless communication device. In other embodiments, the identified new operating mode may be identified by querying a server, such as a central control settings server.

In determination block 208, the wireless communication device processor may determine whether the set of operating characteristics that makes up the identified new operating mode is available on the wireless communication device. In response to determining that the set of operating characteristics that makes up the identified new operating mode is not available (i.e., determination block 208="No"), the wireless communication device processor may send request for such information to a central settings server in block 210, which may respond by returning information about the operating characteristics of the identified operating mode. In response to determining that the set of operating characteristics that makes up the identified operating mode is available (i.e., determination block 208="Yes"), the wireless communication device processor may prompt an automatic switch by implementing the identified new operating mode of the wireless communication device in block 212. In some embodiments the operating system executing on the processor may implement the switch to the new operating mode, while in other embodiments the processor may implement the switch to the new operating mode without involving the operating system.

In block 214, the wireless communication device processor may determine whether a mode control capability should be automatically switched. For example, the wireless communication device processor may access a local database or other structure to identify a mode control capability setting, which may dictate whether the user should have the ability to manually override (i.e., switch out of) the new operating mode. In various embodiments, an initial default setting of the mode control capability may allow such override. In some embodiments, the implemented new operating mode may be associated with a particular mode control capability setting, which may be automatically implemented by the wireless communication device processor once obtained from the local database or other data structure. In other embodiments, multiple mode control capability settings may be associated with the new operating mode, and the automatic switching determination may be performed based on additional criteria. In some embodiments, the wireless communication device may also compare a current mode control capability setting implemented on the wireless communication device to the identified mode control capability setting as part of the determination of whether a mode control capability should be automatically switched.

In response to determining that the mode control capability does not need to be switched (i.e., determination block 214="No"), the wireless communication device processor may maintain the current mode control capability setting in block 216. In response to determining that the mode control capability needs to be switched to a new mode control capability setting (i.e., determination block 214="Yes"), the wireless communication device processor may implement a new mode control capability setting in block 218.

Figure 3:
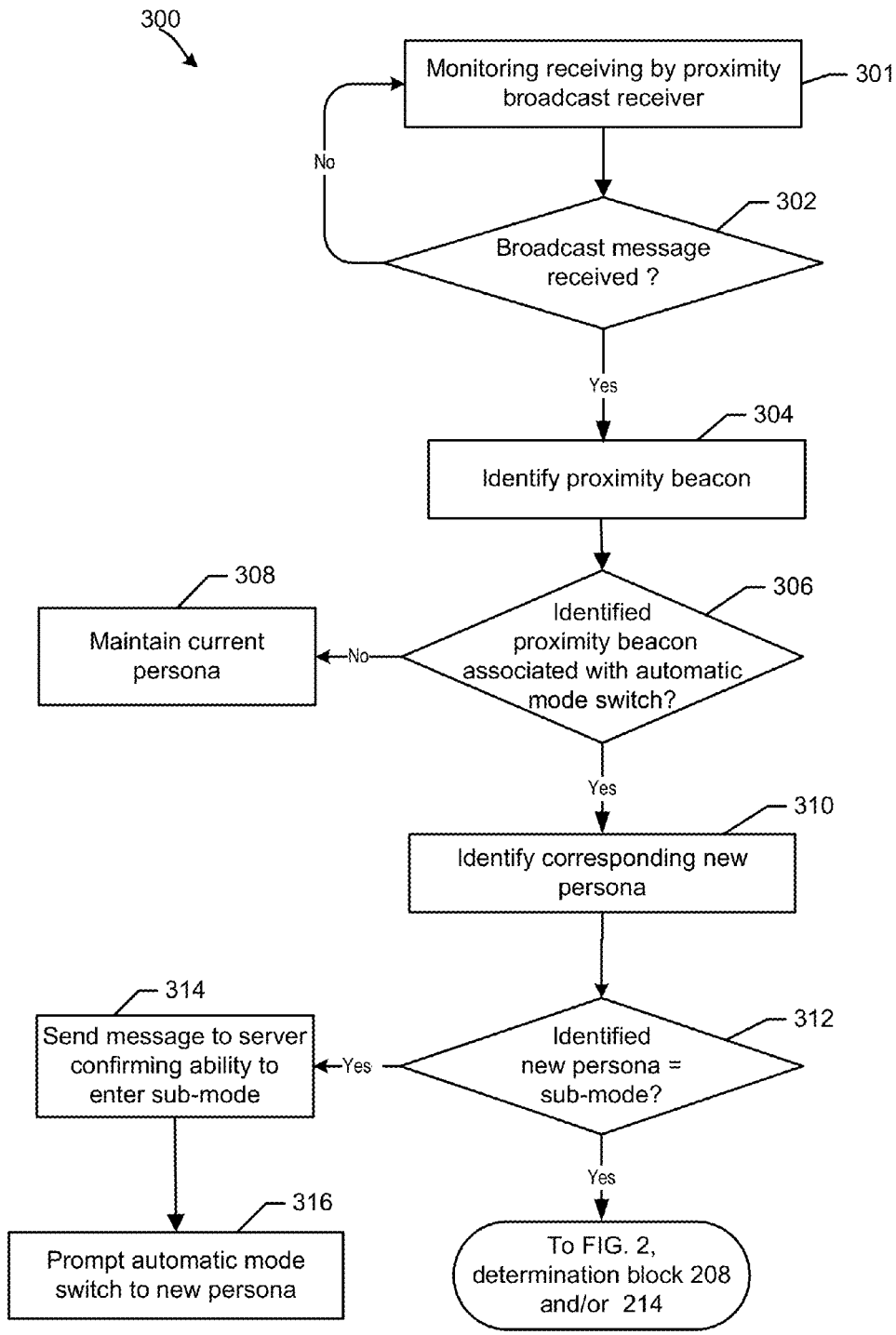
FIG. 3 is a process flow diagram illustrating an embodiment method for managing automatic mode switching triggered by a broadcast message received from a proximity beacon.

FIG. 3 illustrates another embodiment method 300 that may be implemented by a wireless communication device processor running a secure persona switching engine on the wireless communication device. In block 301, a wireless communication device processor may continuously operate in a monitoring mode to determine whether a proximity broadcast receiver application of the wireless communication device has received a broadcast message in determination block 302. In response to determining that the proximity broadcast receiver of the wireless communication device has not received a broadcast message (i.e., determination block 302="No"), the wireless communication device processor may return to the continuous monitoring state in block 301 and determination block 302. In response to determining that the proximity broadcast receiver application has received a broadcast message (i.e., determination block 302="Yes"), in block 304, the wireless communication device processor may identify the proximity beacon serving as the source of the broadcast message. In some embodiments, the signals received from the proximity beacon may provide sufficient information to allow the wireless communication device processor to identify the proximity beacon source. In other embodiments, proximity broadcast receivers may relay received broadcast signals, along with other information (e.g., timestamp data, proximity information, etc.), to a central server in the form of sighting messages, which may be used to return an identification of the proximity beacon to the wireless communication device.

In determination block 306 the wireless communication device processor may determine whether the identified proximity beacon is associated with an automatic mode switch (i.e., a new persona). In response to determining that the identified proximity beacon is not associated with an automatic mode switch (i.e., determination block 306="No"), in block 308 the wireless communication device processor may maintain a current persona and ignore the received broadcast. In response to determining that the identified proximity beacon is associated with an automatic mode switch (i.e., determination block 306="Yes"), the wireless communication device processor may identify the corresponding new persona (i.e., a corresponding operating mode and/or control capability) in block 310. In some embodiments, identifying the corresponding new persona may be performed by accessing a local database or other data structure maintained in secure storage on the wireless communication device. In other embodiments, the identified new persona may be identified by querying a server, such as a central control settings server.

In various embodiments, including but not limited to those in which proximity sensors are used, the identified new persona may be a sub-mode of another, broader persona. For example, a particular sub-mode of a broader persona may include content that provides specialized abilities to some, but not all, users that have implemented the broader persona. In determination block 312, the wireless communication device processor may determine whether the identified new persona is a sub-mode of a broader persona. In response to determining that the identified new persona is a sub-mode of a broader persona (i.e., determination block 312="Yes"), in block 314 the wireless communication device processor may send a message to a central control settings server to confirm that the device is able to enter the sub-mode. For example, the wireless communication device processor may check to ensure that there are no additional registrations or permissions that need to be evaluated for the wireless communication device to implement the sub-mode (e.g., for a sub-mode associated with a particular classroom/school course, checking a class attendance list, checking whether a homework assignment was turned in, etc.). In block 316, the wireless communication device processor may implement the sub-mode by prompting an automatic mode switch to the new persona identified in block 310. Such an automatic switch may include identifying operating mode characteristics of the sub-mode, and/or performing various other security or verification checks associated with the sub-mode or broader persona.

In response to determining that the identified new persona is not a sub-mode of a broader persona (i.e., determination block 312="No"), in block 318, the wireless communication device processor may implement the new operating mode and/or mode switching capability identified in block 206 and/or determination block 214 in method 200 described above with reference to FIG. 2. In some embodiments, implementing the identified new persona may involve implementing a new operating mode by returning to determination block 208 in method 200, described above with reference to FIG. 2. In some embodiments, implementing the identified new persona may additionally or alternatively involve implementing a new mode control capability by returning to determination block 214 in method 200 described above with reference to FIG. 2.

Various other embodiments may employ different triggers, modes, and conditions for automatically switching of personas in order to create complex restrictions and enterprise-specific cases. The various embodiments may not be limited to geofence and proximity-based triggers for mode switching. Rather, any of a number of trigger events may be used and/or combined with other trigger events to cause the automatic switching to personas that may be highly customized by an enterprise. Examples of such trigger events may include date- and time- (e.g., time of day and/or time-span) based trigger events. In an example embodiment, a wireless communication device may detect a date- and/or time-based trigger event, which may be used in combination with a geofence event and a received proximity broadcast message to identify a particular corresponding operating mode and/or mode control capability. In another example embodiment, the date- and/or time-based trigger event may identify a particular sub-mode (e.g., for when school is in session, during certain work hours, for a work event or school activity that occurs at a certain time of day/day of the week, etc.) of a broader persona that may already be implemented on the wireless device.

Another type of trigger event may be a real time alert triggered by receiving a notification from a third party device that is authorized to prompt the automatic mode switch. For example, an emergency medical technician (EMT) mode or persona may be triggered by a message that directs an EMT user to an accident scene.

Another type of trigger event may be an application-based trigger, which may automatically start a particular mode or persona upon receipt of an alert in or from an application on the wireless communication device. For example, an alert in a calendar application and/or an email received through a particular email client may provide triggers for automatic mode switching, including switching of an operating mode, a sub-mode and/or mode control capability. For example, an appointment scheduled through a calendar application may provide a trigger for automatic mode switching. Further examples for triggers for automatic mode switching may include a time-based constraint, a date-based constraint, and a signal received from a remote device.

Figure 4:
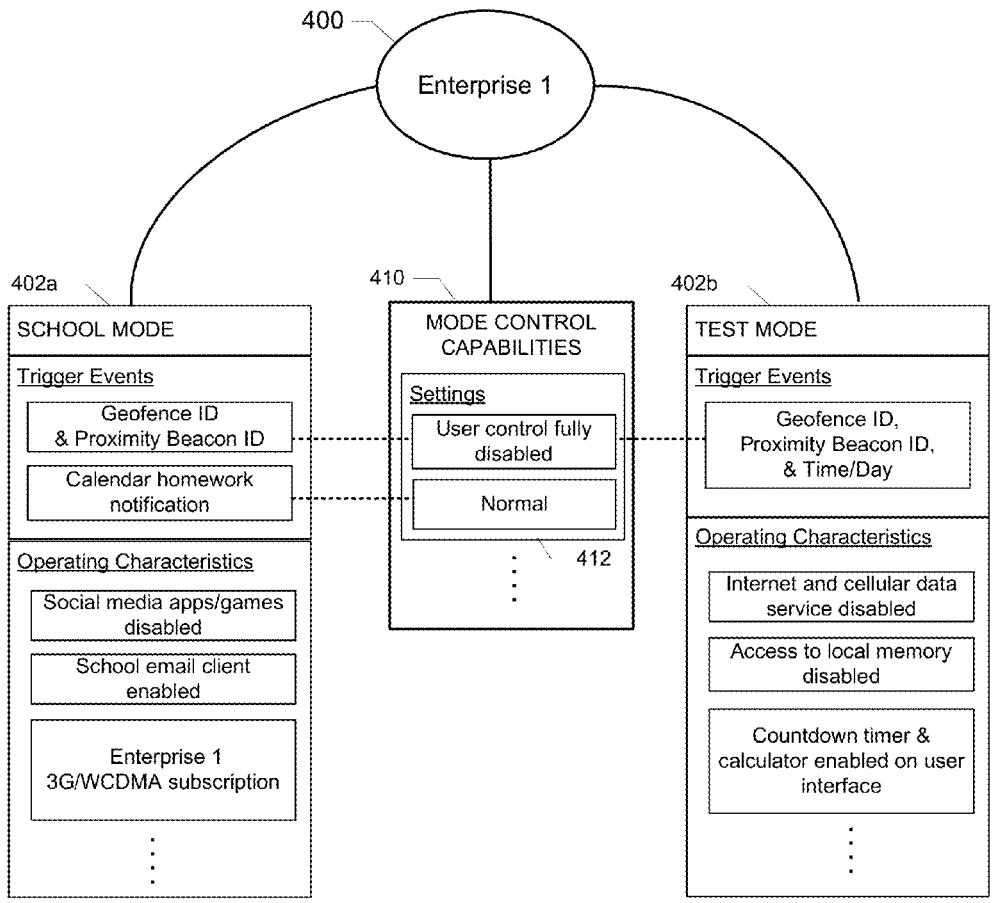
FIG. 4 is a data structure diagram illustrating modes and mode control capabilities associated with an example enterprise and that may be implemented by a wireless communication device.

Some combinations of personas and triggers that may be used by enterprises in the various embodiments are illustrated in FIG. 4, which shows a representative enterprise 400. Data for the representative enterprise 400 ("Enterprise 1") may include trigger events and operating mode characteristics that make up two different operating modes 402a, 402b. Further, relationships between the operating modes 402a, 402b and various mode control capabilities settings 404 may be provided. In an example embodiment, one of the operating modes associated with Enterprise 1 may be a school mode 402a, the data for which may be provided in one or more data structures defining various trigger events, combinations of trigger events, and a set of operating characteristics associated with the school mode 402a. For example, a combination of trigger events that would cause a device to implement the school mode 402a may be an identifier (ID) of a proximity beacon currently located at Enterprise 1, as well as an ID of a geofence encircling the school grounds. A separate trigger event that would cause the device to implement the school mode 402a may be a calendar entry indicating that homework is due on an appointment with a teacher.

The set of operating characteristics that defines the school mode 402a may be included in the same data structure as the trigger events, or may be provided separately. Such a set of operating characteristics may include data fields or flags that prompt the operating system to disable social media apps and games, while enabling a school email client or account. Another operating characteristic that may be part of the school mode 402a identifies or includes provisioning information for a particular wireless access account to be used, such as a particular cellular data network service.

In an example embodiment, another operating mode associated with Enterprise 1 may be a test mode 402b, the data for which may be provided in one or more data structures defining various trigger events, combinations of trigger events, and a set of operating characteristics associated with the test mode 402b. For example, a combination of trigger events that would cause a device to implement the test mode 402a may be an identifier (ID) of at least one proximity beacon currently located at Enterprise 1 and/or in a specific classroom, an ID of a geofence encircling some or all of the school, and particular day/time conditions. The set of operating characteristics (e.g., disabling Internet and cellular network access, disabling local memory access, and enabling a countdown timer and calculator on the user interface) defines the test mode 402b.

FIG. 4 also illustrates that wireless communication devices may be configured with a mode control module 410 that functions to implement various mode control capability settings 412 (i.e., to enable, disable or limit the ability of a user to control the selection of an operating mode). For example, a user's ability to control the implementation of a particular operating mode may be disabled when the user's wireless communication device is within a location or area associated with a particular geofence ID. As such, the operating mode that is currently implemented or automatically switched upon crossing into the geofenced area is not subject to override or changing by the user. Therefore, Enterprise 1 may have a variety of persona options based on the combinations of operating modes 402a, 402b and mode control capability settings 412.

Figure 5:
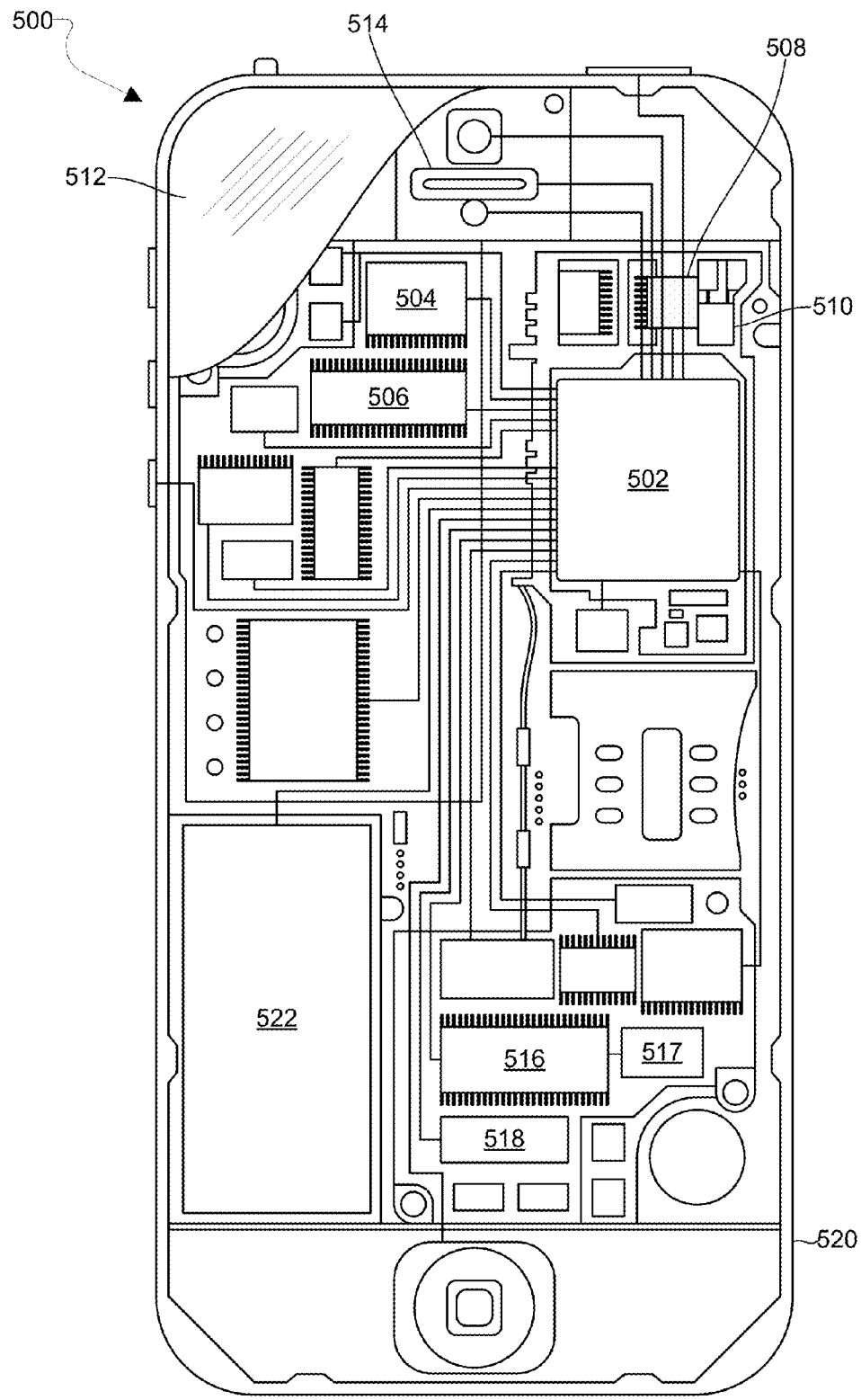
FIG. 5 is a component diagram of an example wireless communication device suitable for use with the various embodiments.

The various embodiments may be implemented in any of a variety of wireless communication devices, an example of which is illustrated in FIG. 5. For example, the wireless communication device 500 may include a processor 502 coupled to internal memories 504 and 506. Internal memories 504 and 506 may be volatile or non-volatile memories, and may also be secure and/or encrypted memories, or unsecure and/or unencrypted memories, or any combination thereof. The processor 502 may also be coupled to a touch screen display 512, such as a resistive-sensing touch screen, capacitive-sensing touch screen infrared sensing touch screen, or the like. Additionally, the display of the wireless communication device 500 need not have touch screen capability.

The wireless communication device 500 may have one or more radio frequency (RF) transceivers 508 (e.g., Peanut®, Bluetooth®, Zigbee®, Wi-Fi, RF radio) and antennas 510, for sending and receiving wireless signals, coupled to each other and/or to the processor 502. The wireless communication device 500 may include a cellular network interface, such as wireless modem or modem chip 516 including a processor. The modem or modem chip 516 may enable communication via a wide area network, such as a cellular data network (e.g., CDMA, TDMA, GSM, PCS, 3G, 4G, LTE, or any other type of cellular data network) and may be coupled to the processor 502. In another embodiment, the modem or modem chip 516 may be coupled to an optional component 517 that includes a processor and/or memory to support the modem or modem chip 516 in controlling access to content. The modem or modem chip 516 and optional component 517 may be completely separate pieces of hardware or may be hardware components on the same chip.

The wireless communication device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port. The wireless communication device 500 may also include speakers 514 for providing audio outputs. The wireless communication device 500 may also include a housing 520, constructed of a plastic, metal, or a combination of materials, for containing all or some of the components discussed herein. The wireless communication device 500 may include a power source 522 coupled to the processor 502, such as a disposable or rechargeable battery. The rechargeable battery may also be coupled to the peripheral device connection port to receive a charging current from a source external to the wireless communication device 500.

Figure 6:
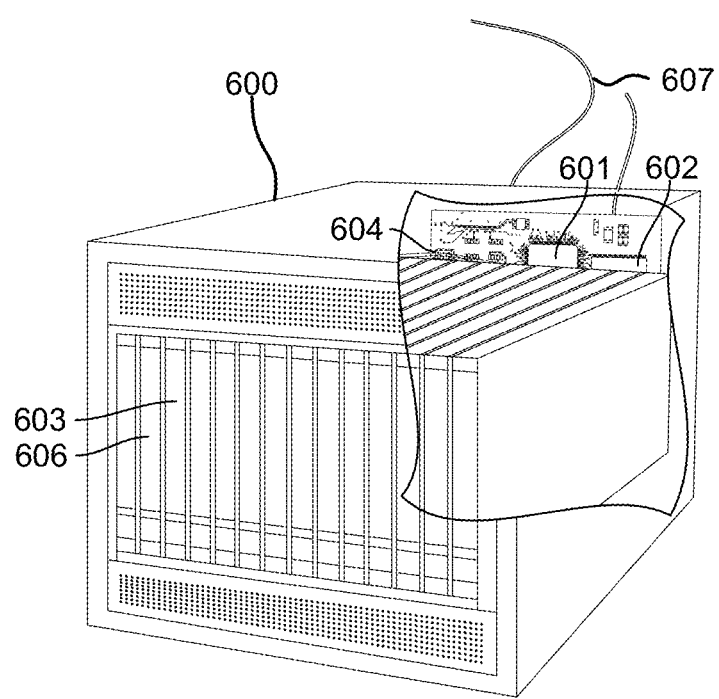
FIG. 6 is a component diagram of an example server suitable for use with the various embodiments.

The various embodiments may also be implemented on any of a variety of commercially available server devices, such as the server 600 illustrated in FIG. 6. Such a server 600 typically includes a processor 601 coupled to volatile memory 602 and a large capacity nonvolatile memory, such as a disk drive 603. The server 600 may also include a floppy disc drive, compact disc (CD) or DVD disc drive 604 coupled to the processor 601. The server 600 may also include network access ports 606 coupled to the processor 601 for establishing network interface connections with a network 607, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 502, 601, modem or modem chip 516, and optional component 517 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in an internal memory before they are accessed and loaded into the processors 502, 601, modem or modem chip 516, and optional component 517. The processors 502, 601, modem or modem chip 516, and optional component 517 may include internal memory sufficient to store the application software instructions. In many devices the internal memory may be a volatile or nonvolatile memory, such as flash memory, or a mixture of both. For the purposes of this description, a general reference to memory refers to memory accessible by the processors 502, 601, modem or modem chip 516, and optional component 517 including internal memory or removable memory plugged into the wireless communication device and memory within the processors 502, 601, modem or modem chip 516, and optional component 517 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for automatically controlling multiple modes on a wireless communication device, comprising:
    receiving signals from a wireless identity transmitter, wherein receiving signals from the wireless identity transmitter indicates that the wireless identity transmitter is within a defined proximity of the wireless communication device;
    determining a first operating mode by applying a location of the wireless communication device to the wireless identity transmitter;
    identifying a set of operating characteristics associated with the first operating mode;
    switching operation of the wireless communication device into the first operating mode by implementing the identified set of operating characteristics associated with the first operating mode on the wireless communication device;
    determining whether the first operating mode is associated with at least one mode control capability, wherein each mode control capability comprises a setting that defines a level of user control for selecting a mode other than the first operating mode; and
    determining whether to switch to a new mode control capability in response to determining that the first operating mode is associated with at least one mode control capability.

2. The method of claim 1, wherein switching operation of the wireless communication device into the first operating mode comprises:
    determining whether the location of the wireless communication device and the wireless identity transmitter are associated with an automatic mode switch to the first operating mode based at least in part on a current operating mode of the wireless communication device; and maintaining the current operating mode of the wireless communication device in response to determining that the location of the wireless communication device and the wireless identity transmitter are associated with an automatic mode switch to the first operating mode.

3. The method of claim 1, wherein determining whether to switch to a new mode control capability comprises:
identifying the at least one mode control capability associated with the first operating mode;
determining whether the at least one mode control capability comprises a plurality of mode control capabilities associated with the first operating mode;
identifying a first mode control capability based on at least the location of the wireless communication device and the wireless identity transmitter in response to determining that the at least one mode control capability comprises a plurality of mode control capabilities associated with the first operating mode; and
identifying the first mode control capability as the one mode control capability associated with the first operating mode in response to determining that the at least one mode control capability does not comprise a plurality of mode control capabilities.

4. The method of claim 3, wherein determining whether to switch to a new mode control capability further comprises:
comparing the first mode control capability to a mode control capability setting currently implemented on the wireless communication device; and
switching to the first mode control capability in response to determining that the first mode control capability does not correspond to the mode control capability setting currently implemented.

5. The method of claim 4, wherein:
the set of operating characteristics associated with the first operating mode comprise at least one of user permissions, user restrictions, a mandated content storage location on the wireless communication device, and a mandated subscription for communication on the wireless communication device; and
the set of operating characteristics associated with the first operating mode and a mode control capability setting associated with the first mode control capability are created by an enterprise.

6. The method of claim 1, wherein receiving signals from the wireless identity transmitter further indicates at least one context associated with the wireless identity transmitter, and wherein the at least one context is applicable to at least a second location such that applying the second location to the wireless identity transmitter determines a second operating mode.

7. The method of claim 6, wherein the second operating mode comprises a sub-mode of the first operating mode.

8. The method of claim 1, further comprising:
receiving a notification of a trigger event selected from a group consisting of an appointment scheduled through a calendar application, a time-based constraint, a date-based constraint, and a signal received from a remote device.

9. The method of claim 8, further comprising:
determining a second operating mode by applying the trigger event to the location of the wireless communication device and the wireless identity transmitter.

10. The method of claim 1, wherein identifying the set of operating characteristics associated with the first operating mode comprises:
determining whether the set of operating characteristics associated with the first operating mode is stored in memory on the wireless communication device; and
sending a request to a server to obtain the set of operating characteristics associated with the first operating mode in response to determining that the set of operating characteristics associated with the first operating mode are not stored in memory.

11. A wireless communication device, comprising:
a radio frequency transceiver; and
a processor coupled to the radio frequency transceiver and configured with processor-executable instructions to perform operations comprising:
receiving signals from a wireless identity transmitter, wherein receiving signals from the wireless identity transmitter indicates that the wireless identity transmitter is within a defined proximity of the wireless communication device;
determining a first operating mode by applying a location of the wireless communication device to the wireless identity transmitter;
identifying a set of operating characteristics associated with the first operating mode;
switching operation of the wireless communication device into the first operating mode by implementing the identified set of operating characteristics associated with the first operating mode on the wireless communication device;
determining whether the first operating mode is associated with at least one mode control capability, wherein each mode control capability comprises a setting that defines a level of user control for selecting a mode other than the first operating mode; and
determining whether to switch to a new mode control capability in response to determining that the first operating mode is associated with at least one mode control capability.

12. The wireless communication device of claim 11, wherein the processor is configured with processor-executable instructions to perform operations such that switching operation of the wireless communication device into the first operating mode comprises:
determining whether the location of the wireless communication device and the wireless identity transmitter are associated with an automatic mode switch to the first operating mode based at least in part on a current operating mode of the wireless communication device; and
maintaining the current operating mode of the wireless communication device in response to determining that the location of the wireless communication device and the wireless identity transmitter are associated with an automatic mode switch to the first operating mode.

13. The wireless communication device of claim 11, wherein the processor is configured with processor-executable instructions to perform operations such that determining whether to switch to a new mode control capability comprises:
identifying the at least one mode control capability associated with the first operating mode;
determining whether the at least one mode control capability comprises a plurality of mode control capabilities associated with the first operating mode;
identifying a first mode control capability based on at least the location of the wireless communication device and the wireless identity transmitter in response to determining that the at least one mode control capability comprises a plurality of mode control capabilities associated with the first operating mode; and identifying the first mode control capability as the one mode control capability associated with the first operating mode in response to determining that the at least one mode control capability does not comprise a plurality of mode control capabilities.

14. The wireless communication device of claim 13, wherein the processor is configured with processor-executable instructions to perform operations such that determining whether to switch to a new mode control capability further comprises:

comparing the first mode control capability to a mode control capability setting currently implemented on the wireless communication device; and switching to the first mode control capability in response to determining that the first mode control capability does not correspond to the mode control capability setting currently implemented.

15. The wireless communication device of claim 14, wherein the processor is configured with processor-executable instructions to perform operations such that:

the set of operating characteristics associated with the first operating mode comprise at least one of user permissions, user restrictions, a mandated content storage location on the wireless communication device, and a mandated subscription for communication on the wireless communication device; and the set of operating characteristics associated with the first operating mode and a mode control capability setting associated with the first mode control capability are created by an enterprise.

16. The wireless communication device of claim 11, wherein the processor is configured with processor-executable instructions to perform operations such that receiving signals from the wireless identity transmitter further indicates at least one context associated with the wireless identity transmitter, and wherein the at least one context is applicable to at least a second location such that applying the second location to the wireless identity transmitter determines a second operating mode.

17. The wireless communication device of claim 16, wherein the processor is configured with processor-executable instructions to perform operations such that the second operating mode comprises a sub-mode of the first operating mode.

18. The wireless communication device of claim 11, wherein the processor is configured with processor-executable instructions to perform operations further comprising:
receiving a notification of a trigger event selected from a group consisting of an appointment scheduled through a calendar application, a time-based constraint, a date-based constraint, and a signal received from a remote device.

19. The wireless communication device of claim 18, wherein the processor is configured with processor-executable instructions to perform operations further comprising:
determining a second operating mode by applying the trigger event to the location of the wireless communication device and the wireless identity transmitter.

20. The wireless communication device of claim 11, wherein the processor is configured with processor-executable instructions to perform operations such that identifying the set of operating characteristics associated with the first operating mode comprises:

determining whether the set of operating characteristics associated with the first operating mode are stored in memory on the wireless communication device; and sending a request to a server to obtain the set of operating characteristics associated with the first operating mode in response to determining that the set of operating characteristics associated with the first operating mode are not stored in memory.

21. A wireless communication device, comprising:

means for receiving signals from a wireless identity transmitter, wherein receiving signals from the wireless identity transmitter indicates that the wireless identity transmitter is within a defined proximity of the wireless communication device;

means for determining a first operating mode by applying a location of the wireless communication device to the wireless identity transmitter;

means for identifying a set of operating characteristics associated with the first operating mode;

means for switching operation of the wireless communication device into the first operating mode by implementing the identified set of operating characteristics associated with the first operating mode on the wireless communication device;

means for determining whether the first operating mode is associated with at least one mode control capability, wherein each mode control capability comprises a setting that defines a level of user control for selecting a mode other than the first operating mode; and means for determining whether to switch to a new mode control capability in response to determining that the first operating mode is associated with at least one mode control capability.

22. The wireless communication device of claim 21, wherein means for switching operation of the wireless communication device into the first operating mode comprises:

means for determining whether the location of the wireless communication device and the wireless identity transmitter are associated with an automatic mode switch to the first operating mode based at least in part on a current operating mode of the wireless communication device; and means for maintaining the current operating mode of the wireless communication device in response to determining that the location of the wireless communication device and the wireless identity transmitter are associated with an automatic mode switch to the first operating mode.

23. The wireless communication device of claim 21, wherein means for determining whether to switch to a new mode control capability comprises:

means for identifying at least one mode control capability associated with the first operating mode;

means for determining whether the at least one mode control capability comprises a plurality of mode control capabilities associated with the first operating mode;

means for identifying a first mode control capability based on at least the location of the wireless communication device and the wireless identity transmitter in response to determining that the at least one mode control capability comprises a plurality of mode control capabilities associated with the first operating mode;

means for identifying the first mode control capability as the one mode control capability associated with the first operating mode in response to determining that the at least one mode control capability does not comprise a plurality of mode control capabilities;

means for comparing the first mode control capability to a mode control capability setting currently implemented on the wireless communication device in response to determining that the first operating mode is associated with at least one mode control capability; and means for switching to the first mode control capability in response to determining that the first mode control capability does not correspond to the mode control capability setting currently implemented.

24. The wireless communication device of claim 21, wherein means for identifying the set of operating characteristics associated with the first operating mode comprises:
   means for determining whether the set of operating characteristics associated with the first operating mode are stored in memory on the wireless communication device; and
   means for sending a request to a server to obtain the set of operating characteristics associated with the first operating mode in response to determining that the set of operating characteristics associated with the first operating mode are not stored in memory.

25. A non-transitory processor-readable storage medium having stored thereon processor-executable instructions configured to cause a processor of a wireless communication device to perform operations comprising:
   receiving signals from a wireless identity transmitter, wherein receiving signals from the wireless identity transmitter indicates that the wireless identity transmitter is within a defined proximity of the wireless communication device;
   determining a first operating mode by applying a location of the wireless communication device to the wireless identity transmitter;
   identifying a set of operating characteristics associated with the first operating mode;
   switching operation of the wireless communication device into the first operating mode by implementing the identified set of operating characteristics associated with the first operating mode on the wireless communication device;
   determining whether the first operating mode is associated with at least one mode control capability, wherein each mode control capability comprises a setting that defines a level of user control for selecting a mode other than the first operating mode; and
   determining whether to switch to a new mode control capability in response to determining that the first operating mode is associated with at least one mode control capability.

26. The non-transitory processor-readable storage medium of claim 25, wherein the stored processor-executable instructions are configured to cause a processor of a wireless communication device to perform operations such that switching operation of the wireless communication device into the first operating mode comprises:
   determining whether the location of the wireless communication device and the wireless identity transmitter are associated with an automatic mode switch to the first operating mode based at least in part on a current operating mode of the wireless communication device; and
   maintaining the current operating mode of the wireless communication device in response to determining that the location of the wireless communication device and the wireless identity transmitter are associated with an automatic mode switch to the first operating mode.

27. The non-transitory processor-readable storage medium of claim 25, wherein the stored processor-executable instructions are configured to cause a processor of a wireless communication device to perform operations such that determining whether to switch to a new mode control capability comprises:
   identifying at least one mode control capability associated with the first operating mode;
   determining whether the at least one mode control capability comprises a plurality of mode control capabilities associated with the first operating mode;
   identifying a first mode control capability based on at least the location of the wireless communication device and the wireless identity transmitter in response to determining that the at least one mode control capability comprises a plurality of mode control capabilities associated with the first operating mode;
   identifying the first mode control capability as the one mode control capability associated with the first operating mode in response to determining that the at least one mode control capability does not comprise a plurality of mode control capabilities;
   comparing the first mode control capability to a mode control capability setting currently implemented on the wireless communication device in response to determining that the first operating mode is associated with at least one mode control capability; and
   switching to the first mode control capability in response to determining that the first mode control capability does not correspond to the mode control capability setting currently implemented.

28. The non-transitory processor-readable storage medium of claim 25, wherein the stored processor-executable instructions are configured to cause a processor of a wireless communication device to perform operations such that identifying the set of operating characteristics associated with the first operating mode comprises:
   determining whether the set of operating characteristics associated with the first operating mode are stored in memory on the wireless communication device; and
   sending a request to a server to obtain the set of operating characteristics associated with the first operating mode in response to determining that the set of operating characteristics associated with the first operating mode are not stored in memory.

* * * * *